US005463788A

United States Patent [19]
Ennis

[11] Patent Number: 5,463,788
[45] Date of Patent: Nov. 7, 1995

[54] MECHANIZED AUTOMATED VEHICLE WASHING APPARATUS

[75] Inventor: G. Thomas Ennis, Inglewood, Calif.

[73] Assignee: N/S Corporation, Inglewood, Calif.

[21] Appl. No.: 63,229

[22] Filed: May 12, 1993

[51] Int. Cl.$^6$ .................................................. B60S 3/04
[52] U.S. Cl. ........................ 15/97.3; 15/DIG. 2; 15/53.2
[58] Field of Search .............................. 15/97.3, DIG. 2, 15/53.1, 53.2, 53.3

[56] References Cited

U.S. PATENT DOCUMENTS

| 3,793,667 | 2/1974 | Capra | 15/DIG. 2 |
|---|---|---|---|
| 4,096,600 | 6/1978 | Belanger | 15/97.3 |
| 4,166,302 | 9/1979 | Kim | 15/97.3 |
| 4,225,995 | 10/1980 | Ennis | 15/53.1 |
| 4,369,541 | 1/1983 | Belanger et al. | 15/97.3 |
| 4,620,805 | 11/1986 | Belanger | 384/297 |
| 4,640,631 | 2/1987 | Belanger | 384/297 |
| 4,756,040 | 7/1988 | Sereny | 15/97.3 |
| 5,077,859 | 1/1992 | Ennis | 15/230 |
| 5,134,742 | 8/1992 | Ennis | 15/53.1 |
| 5,161,557 | 11/1992 | Scheiter, Jr. | 134/123 |

FOREIGN PATENT DOCUMENTS

| 2111928 | 9/1972 | Germany | 15/DIG. 2 |
|---|---|---|---|
| 0151155 | 8/1985 | Japan | 15/97.3 |

Primary Examiner—Edward L. Roberts, Jr.
Attorney, Agent, or Firm—Staas & Halsey

[57] ABSTRACT

A mechanized vehicle washing apparatus includes top scrubber curtain pivotally mounted to a frame for pivotal movement in a horizontal plane into and out of a path of a vehicle to be washed. The top scrubber curtains may be reciprocated either forwardly and backwardly in directions parallel to the path of a vehicle to be washed or from side to side in directions transverse or angular to the path. The apparatus also may include wrap around brushes pivoted overhead on each side of the frame for pivotal movement into and out of the path of a vehicle being washed. The apparatus further may include high pressure spinner nozzles for high pressure wash and rinse cycles so that the apparatus may be operated in either a touching or a touchless mode. Both the top scrubber curtains and the wrap around brushes preferably employ a deep pile, fur-like material as the washing material.

23 Claims, 11 Drawing Sheets

MECHANIZED AUTOMATED VEHICLE WASHING APPARATUS

BACKGROUND OF THE INVENTION

1. Field of the Invention

The present invention relates to an improved automatic vehicle washing apparatus and more particularly to such an apparatus having one or more retractable scrubber curtain assemblies. The apparatus further may include a pair of wrap around brushes controlled by a single cylinder as well as stackable, folding legs.

2. Description of the Related Art

In the field of mechanized vehicle washing, the devices employed are generally of two types. The first is a rollover type wherein the components of the device are mounted on a frame which in turn is mounted on wheels for movement along a predetermined path wherein the rollover device is moved forwardly and backwardly over a vehicle to wash the vehicle. The second is a stationary type, often referred to as a tunnel wash, whereby the various components are mounted on stationary frame means and the vehicle to be washed is moved through the device either by conveyor means or by driving the car therethrough along a predetermined path.

In addition, both of the above-described types of vehicle washing devices may be employed in a frictionless or touchless mode wherein high pressure wash and rinse cycles are utilized so that no cleaning components touch the vehicle or in a touching mode wherein the cleaning components touch the vehicle.

In recent years, the touchless type of carwash apparatus has become more and more popular since many vehicle operators do not want any of the cleaning components such as brushes or curtains touching their vehicles. Nevertheless, a significant number of vehicle users still prefer their vehicle to be washed in the mode wherein the cleaning components touch the vehicle. In the circumstances, a need has arisen for mechanized vehicle washing devices which can be operated in either a touchless or a touching mode. To do so, it is necessary that the washing components such as brushes and scrubber curtains which normally touch a vehicle during a touching washing operation be capable of being removed from the path of the vehicle during operation of the device in a touchless mode.

It has been known in the past to be able to retract washing components such as wrap around brushes and rocker panels out of the path of a vehicle being washed and to raise top brushes and top scrubber curtains above the path of the vehicle being washed.

Some manufacturers have utilized the concept of raising a top brush and spinning it in an attempt to rid it of any excess water and soap so that a vehicle underneath will not be dripped on when the washing device is operated in a touchless mode. It has also been known to employ scrubber curtains above the path of a vehicle being washed wherein the scrubber curtains are retracted by rolling them up overhead of the vehicle on a drum. When the washing device is operated in a touching mode, the scrubber curtain components are unrolled whereby they hang down and are oscillated to scrub the top of a vehicle. This type of apparatus suffers from the disadvantage that even when the curtains are raised and rolled up on the drum, materials still drip from the curtain onto a vehicle underneath. Moreover, such devices require a complex construction.

Other prior art vehicle washing devices employ a wrap around brush assembly on each side of the path of a vehicle being washed wherein a separate cylinder or control means is required to control the pivotal movement of each brush, thereby increasing the complexity of the device.

Still other prior art vehicle washing devices are constructed of heavy materials which are difficult to handle and set up and also present problems in packaging and shipping.

The prior art vehicle washing devices also employ mechanical bearings for supporting various rotating parts. These bearings tend to wear out during use and must be periodically serviced and/or replaced. Mechanical bearings also require lubrication. The prior art vehicle washing devices are also constructed out of materials which tend to rust. Others use cleaning materials in the brushes and curtains which tend to scratch or otherwise mar the surface of a vehicle.

Prior art rollover type vehicle washing devices mounted on wheels heretofore have employed metal wheels and bearings which are not only heavy and cumbersome, but which also wear out and need to be replaced.

SUMMARY OF THE INVENTION

It is an object if the present invention to provide a mechanized vehicle washing apparatus which may be operated either in a touchless or a touching mode.

It is another object of the present invention to provide a mechanized vehicle washing apparatus which employs a top scrubber curtain which may be easily retracted to one side whereby it is out of the path of a vehicle being washed.

It is a further object of the present invention to provide a mechanized vehicle washing apparatus employing a pair of top scrubber curtains retractable to the sides and whose pivotal movements are controlled by a single cylinder or control means.

It is still a further object of the present invention to provide a mechanized vehicle washing apparatus employing a pair of wrap around brushes whose movements are controlled by a single cylinder or control means.

It is another object of the present invention to provide a mechanized vehicle washing apparatus employing a pair of top scrubber curtains retractable to the sides thereof and a pair of wrap around brushes whose pivotal movements are controlled by a single cylinder or control means.

It is still a further object of the present invention to provide a mechanized vehicle washing apparatus which includes a top scrubber curtain which may be retractable out of the path of a vehicle being washed and which when positioned in an operable washing position in the path of the vehicle being washed is capable of reciprocating the individual curtain strips forwardly and backwardly in directions parallel to the path of the vehicle.

It is a further object of the present invention to provide a mechanized vehicle washing apparatus employing top scrubber curtains which may be reciprocated either front to back or side to side or angular of the vehicle being washed.

It is still another object of the present invention to provide a mechanized vehicle washing apparatus which does not employ mechanical bearings but rather employs ultrahigh molecular weight plastic bearings for supporting the major moving washing parts.

It is another object of the present invention to provide a mechanized vehicle washing apparatus which includes a top scrubber curtain which is reciprocated by a crank arm comprised of ultrahigh molecular weight plastic and which requires no mechanical bearings at its connection points.

It is another object of the present invention to provide a mechanized vehicle washing apparatus of the rollover type having a frame which is mounted on plastic wheels constructed of an ultrahigh molecular weight plastic material.

It is another object of the present invention to provide a mechanized vehicle washing apparatus of the rollover type employing a wrap around brush for each side of the vehicle and which is controlled so that the direction of rotation of each brush is reversed as the rollover device reverses direction.

It is still another object of the present invention to provide a mechanized vehicle washing apparatus having a frame with stackable, foldable legs which facilitate packing, shipping and setting up of the devices.

It is a further object of the present invention to provide a mechanized vehicle washing apparatus which is constructed of light weight materials.

It is a further object of the present invention to provide a mechanized vehicle washing apparatus employing non-abrasive washing materials which do not damage the finish of a vehicle being washed.

The present invention achieves the above objects by providing a mechanized vehicle washing apparatus which includes a frame and at least one top scrubber curtain pivotally mounted to the frame and having means for pivoting the scrubber curtain in a horizontal plane into and out of the path of a vehicle to be washed. Preferably the device includes a top scrubber curtain pivotally mounted on each side of the frame. Where two top scrubber curtains are employed, one embodiment of the device includes a single common cylinder for controlling pivotal movement of both of the curtains. The top scrubber curtain members may be reciprocated either forwardly and backwardly in directions parallel to the path of a vehicle to be washed or from side to said in directions transverse or angular to the path of a vehicle to be washed. The washing apparatus also may include a wrap around brush pivoted on each side of the frame with the pivotal movement of each brush being controlled separately or alternatively by a single common cylinder.

The mechanized vehicle washing apparatus may be either of the rollover type whereby it is moved forwardly and backwardly over a vehicle or of the stationary type, often referred to as a tunnel wash, wherein the various components are mounted on a stationary frame means and the vehicle to be washed is moved through the apparatus.

The device further includes high pressure spinner nozzles for high pressure wash and rinse cycles so the device may be operated in either a touching or a touchless mode. Both the top scrubber curtains and the wrap around brushes are comprised of a deep pile, fur-like material which provides a soft scrubbing action on the vehicle without tending to scratch the surface thereof.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Referring now to FIGS. 1–4 of the drawings, a mechanized vehicle washing apparatus, generally referred to by the numeral 10, according to one embodiment of the invention is shown comprising an overhead frame 12 having a pair of top scrubber curtains 14 and 16 pivotally mounted on the front of the frame and a pair of wrap around rotary brushes 18 and 20 pivotally mounted to the rear of the frame. The arrows A indicate the direction of pivotal movement of the curtains and the arrows B indicate the pivotal movement of the brushes. The arrow C of FIG. 1 indicates the direction of travel of a vehicle to be washed.

Figure 10:
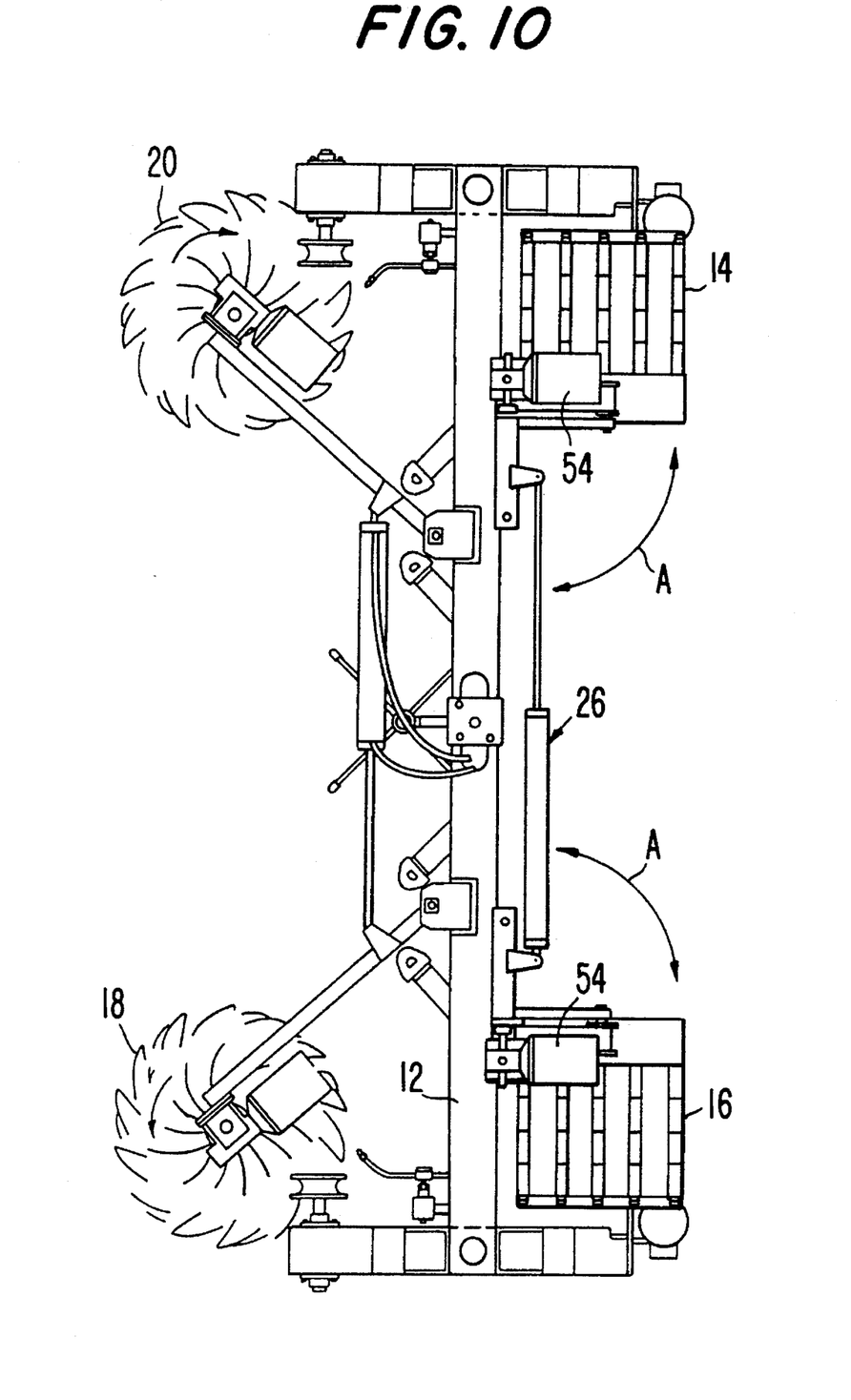
FIG. 10 is a top plan view showing an alternate embodiment of the invention in which the top scrubber curtains are controlled by a single cylinder and reciprocate from side to side when positioned in the path of a vehicle to be washed.

Pivotal movement of the curtains is controlled by a pair of air cylinders 22 and 24 attached to the curtains. As shown in FIG. 10, however, the two air cylinders for operating the scrubber curtains may be replaced by a single air cylinder 26 connected to both of the curtains to simultaneously pivot the curtains into and out of the path of a vehicle to be washed. The curtains are pivotable in a horizontal plane as shown by the arrows A. The use of a single common cylinder results in a simpler and less expensive construction.

Figure 4:
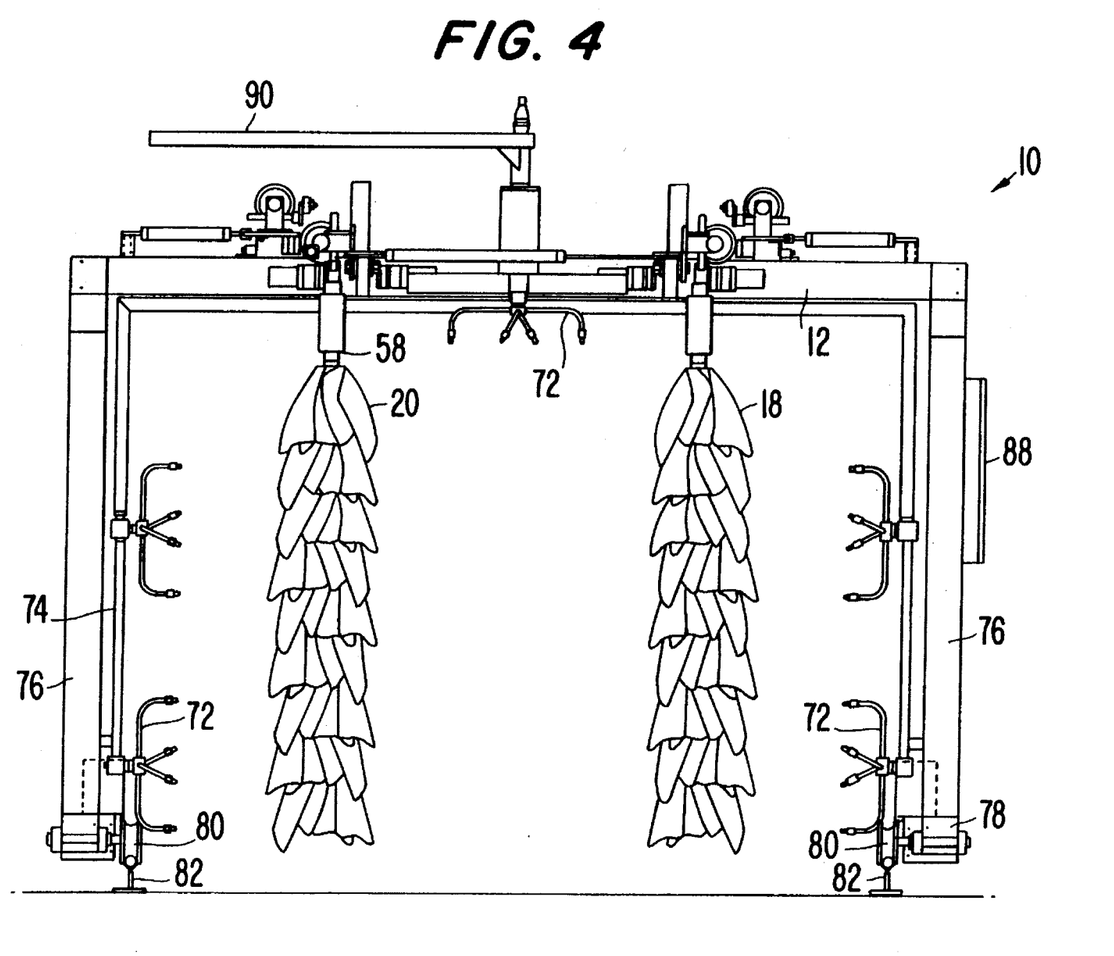
FIG. 4 is a back elevational view of the apparatus of the present invention showing the wrap around brushes positioned in the path of a vehicle to be washed.
Figure 5:
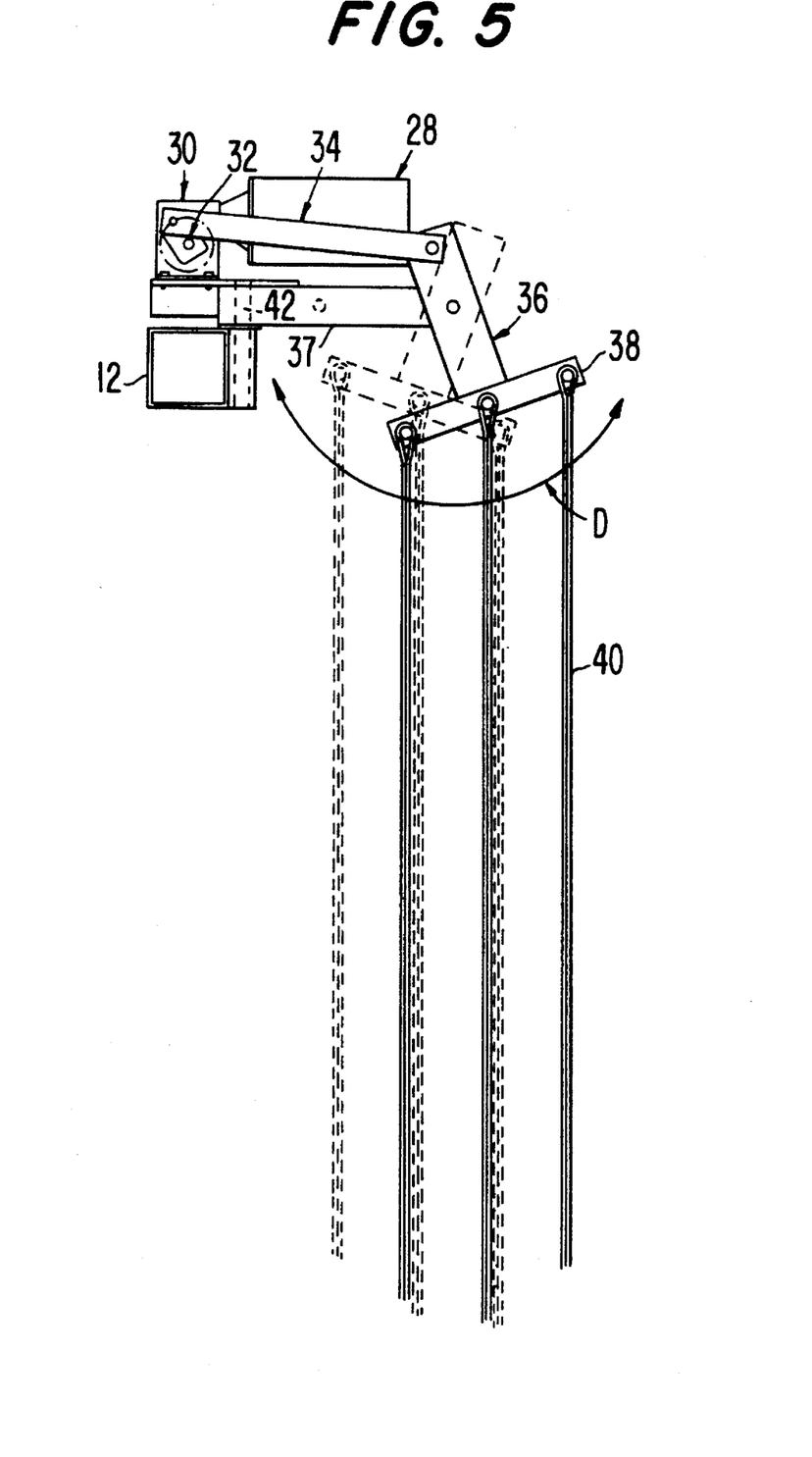
FIG. 5 is an enlarged side view of a top scrubber curtain assembly according to the present invention illustrating front to back reciprocal movement of the curtain.

As shown in FIG. 5, each top scrubber curtain assembly includes an electric motor 28 connected to a gear box 30 which in turn is connected to a motor crank arm 32. A connecting rod 34 is connected at one end to an outer end of the crank arm 32 and is connected at its other end to an upper end of a rocker arm 36. As shown in FIG. 5, rocker arm 36 is pivotably attached to scrubber curtain swing arm 37 whereby it may be moved backwardly and forwardly by the connecting rod 34. Attached to the lower end of rocker arm 36 is a rack 38 for supporting a plurality of elongated curtain strips 40. The rocking movement of the rocking arm creates a back and forth sweeping and up and down motion as shown by the dotted lines in FIG. 5. In the embodiments shown in both FIGS. 1–4 and 10, the angle of movement of the strips 40 with respect to the path of a vehicle to be washed changes as the top scrubber curtains are pivoted. For example, in the embodiment shown in FIGS. 1–4, the movement gradually changes from forwardly and backwardly to side to side as the top scrubber curtains are pivoted to an open or retracted position.

Figure 6:
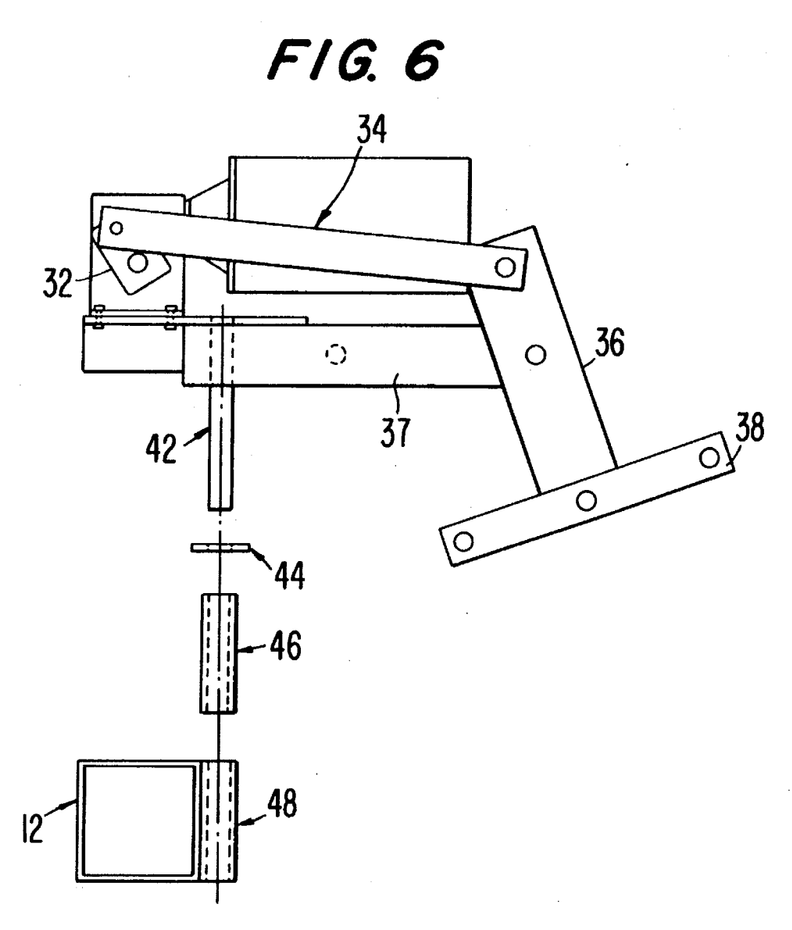
FIG. 6 is an exploded side view showing the mounting portion of the top scrubber curtain.

The connecting rod 34 is constructed of an ultrahigh molecular weight plastic material which has long lasting wearing qualities and does not require the use of mechanical bearings at its pivot points. As most clearly shown in FIGS. 5 and 6, each top scrubber curtain assembly is pivotally attached to the frame 12 by a pivot shaft 42, an ultrahigh molecular weight (UHMW) plastic slide bearing 44, an UHMW plastic long bearing 46 and a long bearing housing 48 welded to the top of the frame 12. The UHMW plastic components eliminate the need for mechanical bearings and accordingly increase the longevity and usefulness of the device.

In the embodiment of the invention shown in FIG. 10, the top scrubber curtains are adapted to reciprocate in directions transverse or angular to the path of a vehicle to be washed. Traverse or side to side movement of the scrubber curtains is achieved by simply changing the angle of the motor 54 and the other connection means.

Figure 1:
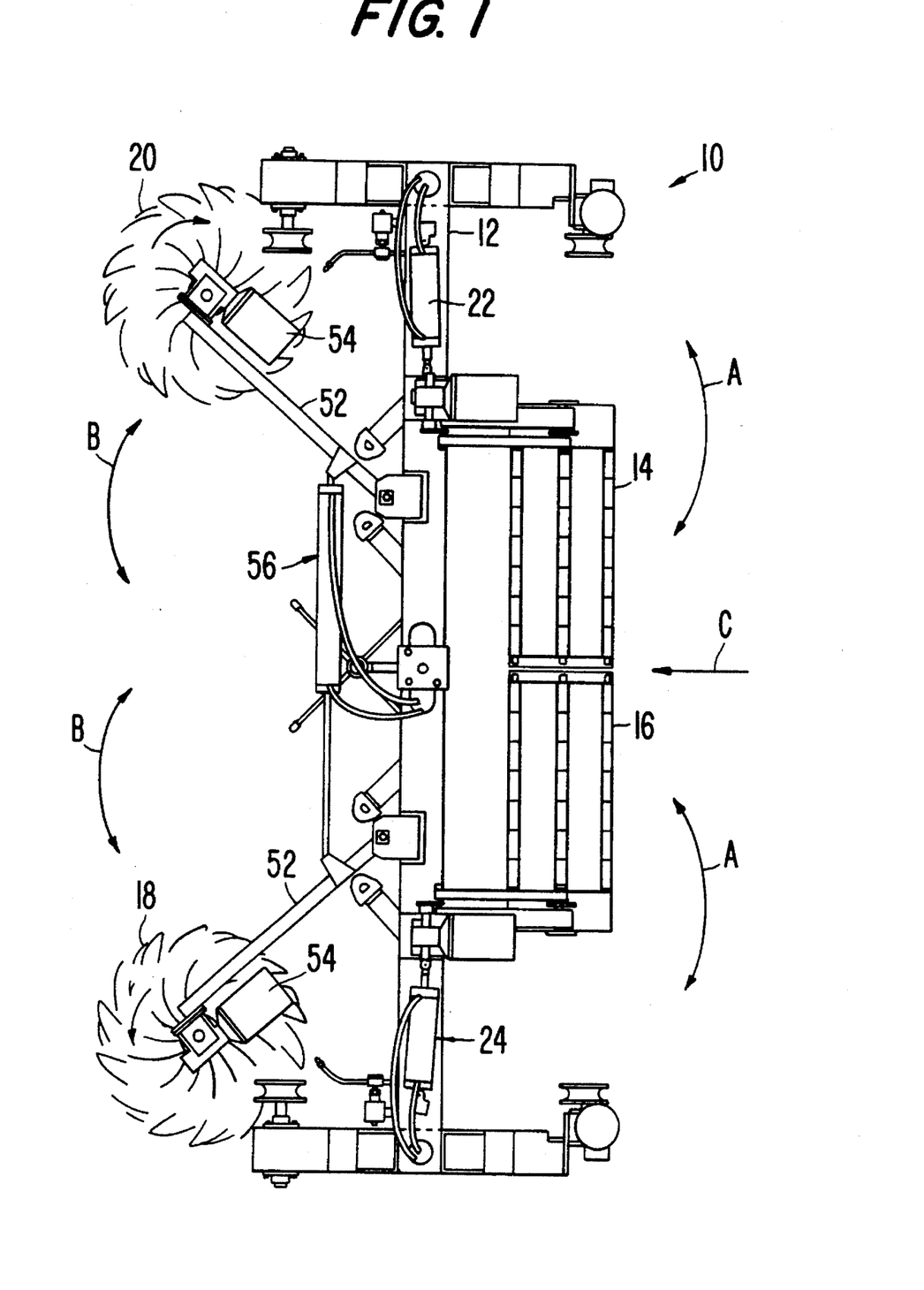
FIG. 1 is a top plan view of a mechanized vehicle washing apparatus according to the present invention showing a pair of top scrubber curtains in a closed operative position in the path of a vehicle to be washed and wrap around brushes in an open position out of the path of a vehicle to be washed.
Figure 2:
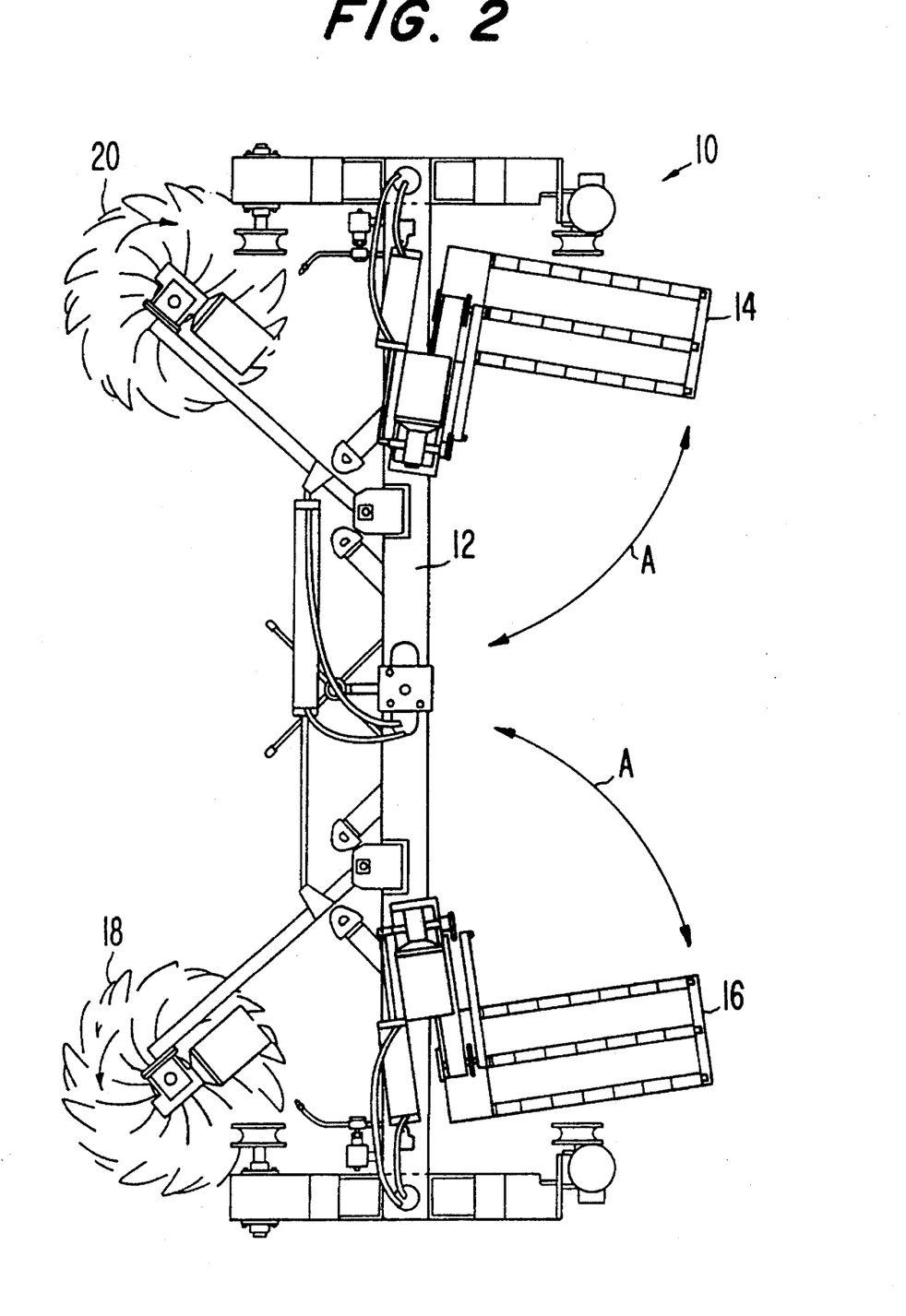
FIG. 2 is a top plan view showing the top scrubber curtains in an open retracted position out of the path of the vehicle to be washed.

Each of the wrap around brushes 18 and 20 is rotatably mounted to the outer end of a swing arm 52 which in turn is pivotally connected at its inner end to an overhead member of the frame 12. Motors 54 are provided for rotating each of the wrap around brushes 18 and 20 in the direction of the arrows F as shown in FIG. 1. The direction of rotation is such as to cause the brushes to walk or propel themselves around a vehicle being washed. As shown in FIG. 1, the horizontal pivoting movement of each of the brushes 18 and 20 may be controlled by a single air cylinder 56 which simultaneously pivots both brushes into and out of the path of a vehicle being washed. The use of a single common air cylinder for both brushes simplifies the construction and decreases the cost of the device. Alternatively, individual cylinders or control means may be used to control the pivotal movement of each brush.

The brushes 18 and 20 are connected to the motor 54 through appropriate drive means 56 and a flexible coupling 58 between the drive means and a shaft 60 upon which the brush is mounted. The flexible coupling may be of the type disclosed in my U.S. Pat. No. 4,225,995 issued Oct. 7, 1980 which is incorporated herein by reference.

Figure 7:
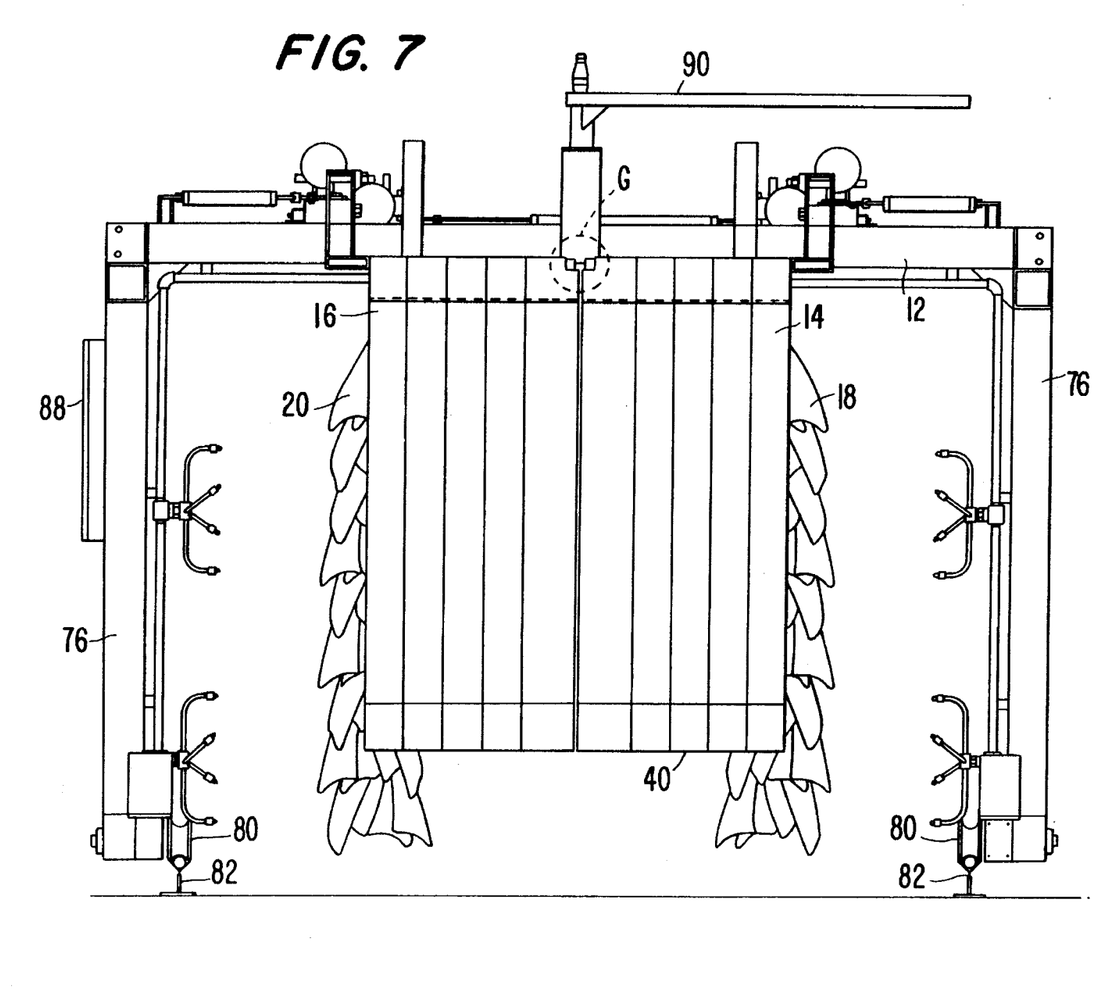
FIG. 7 is a front elevational view of the apparatus shown in FIG. 1 and illustrating both the top scrubber curtains and the wrap around brushes positioned in the path of a vehicle to be washed.
Figure 8:
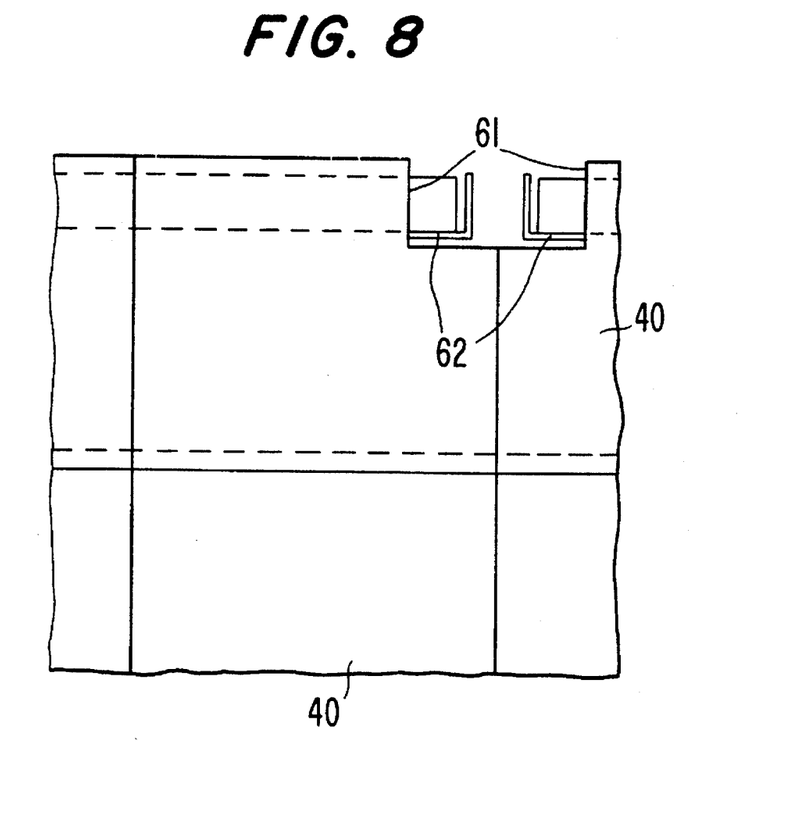
FIG. 8 is an enlarged detail view of area G of FIG. 7 at the point where two top scrubber curtains meet.

The curtains 14 and 16 are comprised of a plurality of sets of elongated strips 40 as best shown in FIG. 7. The outer strips of each curtain preferably are six inches wide while the most inner strip of each curtain is preferably eight inches wide. FIG. 8 is an enlarged view of the structure shown in the dotted line circle G in the center of FIG. 7. As most clearly shown in FIG. 8, the upper inside end of the innermost curtain strip 40 of each curtain is provided with a notch 61 therein for attachment to a tube 62 of rack 38 whereby the inside edge of the innermost strip extends beyond the end of the tube 62. As shown in FIG. 8, this permits the inside edges of the curtains 14 and 16 to be in adjoining relationship thereby insuring that no gap occurs in the washing of the vehicle between the two curtains.

Figure 13:
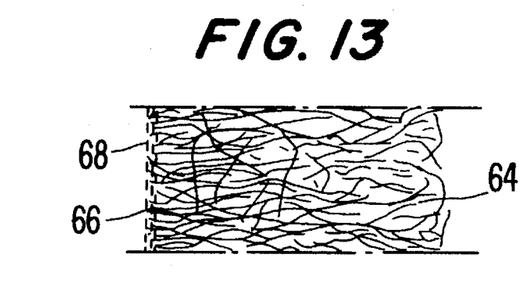
FIG. 13 is an enlarged side elevational view of a piece of the material used in making the curtains and the brushes of the present invention.

The primary material from which both the curtains and the brushes are made is preferably a deep pile, tufted (randomly oriented), monofilament fibrous material manufactured by Borg Fabrics, of New York, N.Y. As shown in FIG. 13 the fabric is a deep pile material which has a fur-like appearance. The deep pile, fur-like material preferably has a thickness or depth of at least ½ inch. In a preferred embodiment, the deep pile, fur-like material has a depth or thickness of approximately ¾ of an inch. The fibers of the material are 85% polyester and 15% acrylic. As shown in FIG. 13, the material is a thick cluster of tufted monofilament fibers 64 upstanding from a woven base 66 which provides a fabric layer. The base 66 is made of 100% polyester or other comparable materials. This woven base provides an elastic backing which is particularly suitable for a hand washed effect. A non-elastic backing 68 may be applied to the base 66 to prevent stretching, particularly when the material is used as a curtain in which the material hangs downwardly.

Figure 3:
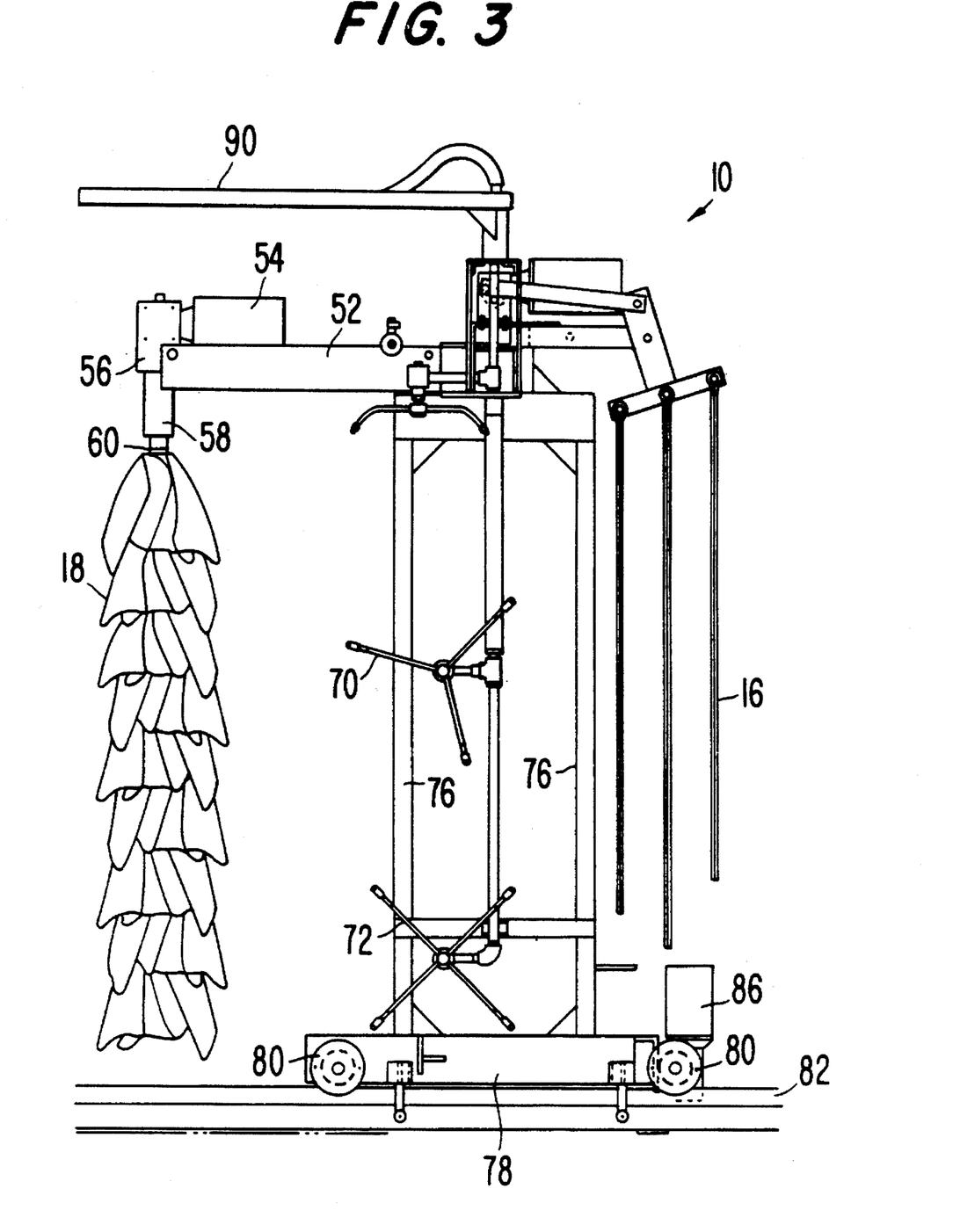
FIG. 3 is a side elevational view of the vehicle washing apparatus shown in FIG. 1.

The present invention is adapted for use both in a frictionless or touchless mode wherein high pressure wash and rinse cycles are utilized so that no cleaning components touch the vehicle or in a touching mode wherein the cleaning components touch the vehicle. So far what has been described relates primarily to components for touching the vehicle. As best shown in FIGS. 3, 4 and 7, the present invention also contemplates a mechanized vehicle washing apparatus which includes a plurality of high pressure jet spinner nozzles mounted to the frame. As shown in FIG. 3, the jet spinner nozzles may either be of the tri-jet type as shown at 70 or of the quadra-jet type as shown at 72. As shown in FIG. 4, the apparatus includes at least two jet spinner nozzles on each side of the frame and one jet spinner nozzle at the top. Suitable high pressure plumbing connections 74 are provided to insure an adequate supply of high pressure liquids being supplied to the nozzles. The jet spinner nozzles provide washing and rinsing liquids at a sufficient pressure to insure an adequate washing and rinsing of a vehicle.

The present invention covers use both in connection with a rollover movable type washing apparatus and a stationary or tunnel type washing apparatus. The rollover type washing apparatus is best shown in FIGS. 3, 4, 7 and 9. As shown therein, each side of frame 12 is provided with a pair of spaced legs 76 connected at the top thereof to the upper portion of frame 12 and connected at the bottom by a base member 78. Each base member 78 of each pair of legs 76 is provided with a pair of rollers or wheels 80 adapted to roll along a track 82.

Figure 9:
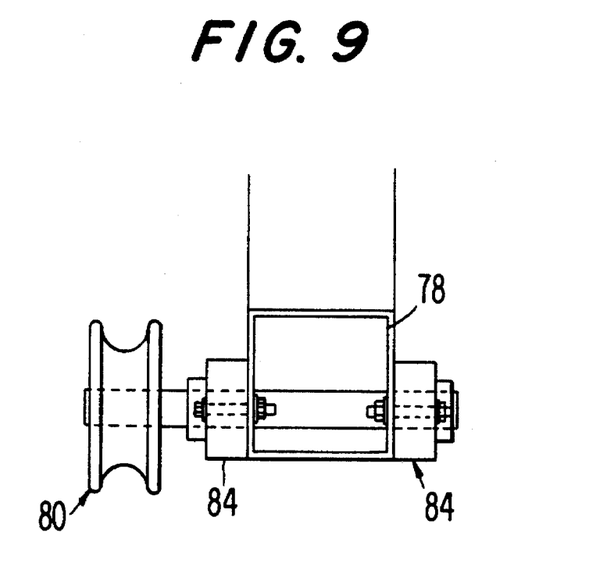
FIG. 9 is an enlarged view showing a roller mounting assembly according to the present invention.

The entire frame 12 including legs 76 and base member 78 is constructed of a light weight material, preferably aluminum. Accordingly, the weight of the entire structure is greatly decreased as compared with conventional washing apparatus. Because of the significantly lighter overall weight of the apparatus, the wheels 80 in the rollover embodiment may be constructed of a suitable nylon material such as Nylatron GSM which is an enhanced long wearing nylon material. Moreover, as best shown in FIG. 9, a pair of long UHMW wheel bearings 84 are provided for supporting the axle upon which each wheel is mounted. The UHMW plastic bearings are long lasting and do not require replacement as often as mechanical bearings. As shown in FIG. 3, suitable motor means 86 are provided for driving the wheels of the rollover type apparatus.

Figure 11:
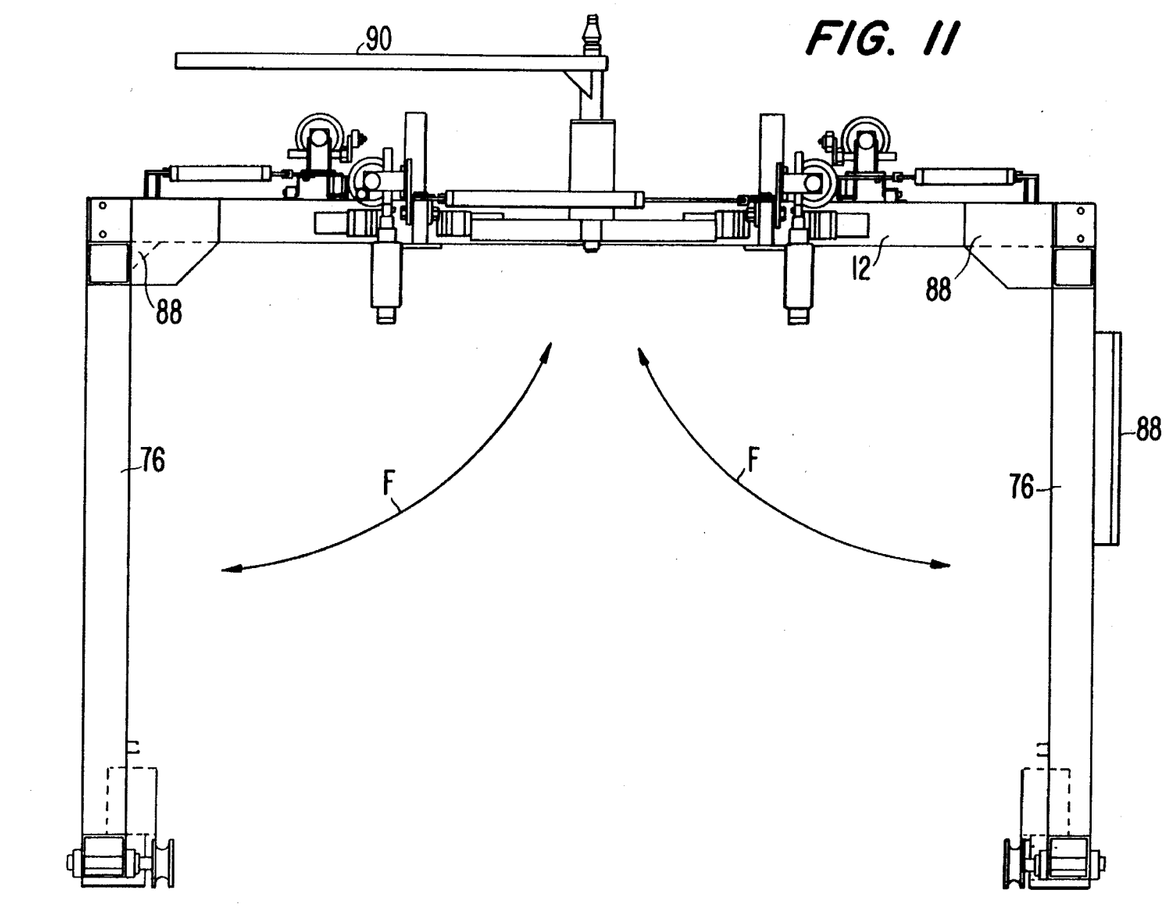
FIG. 11 is a front view illustrating the legs of the frame of the present invention in an extended or operative position.
Figure 12:
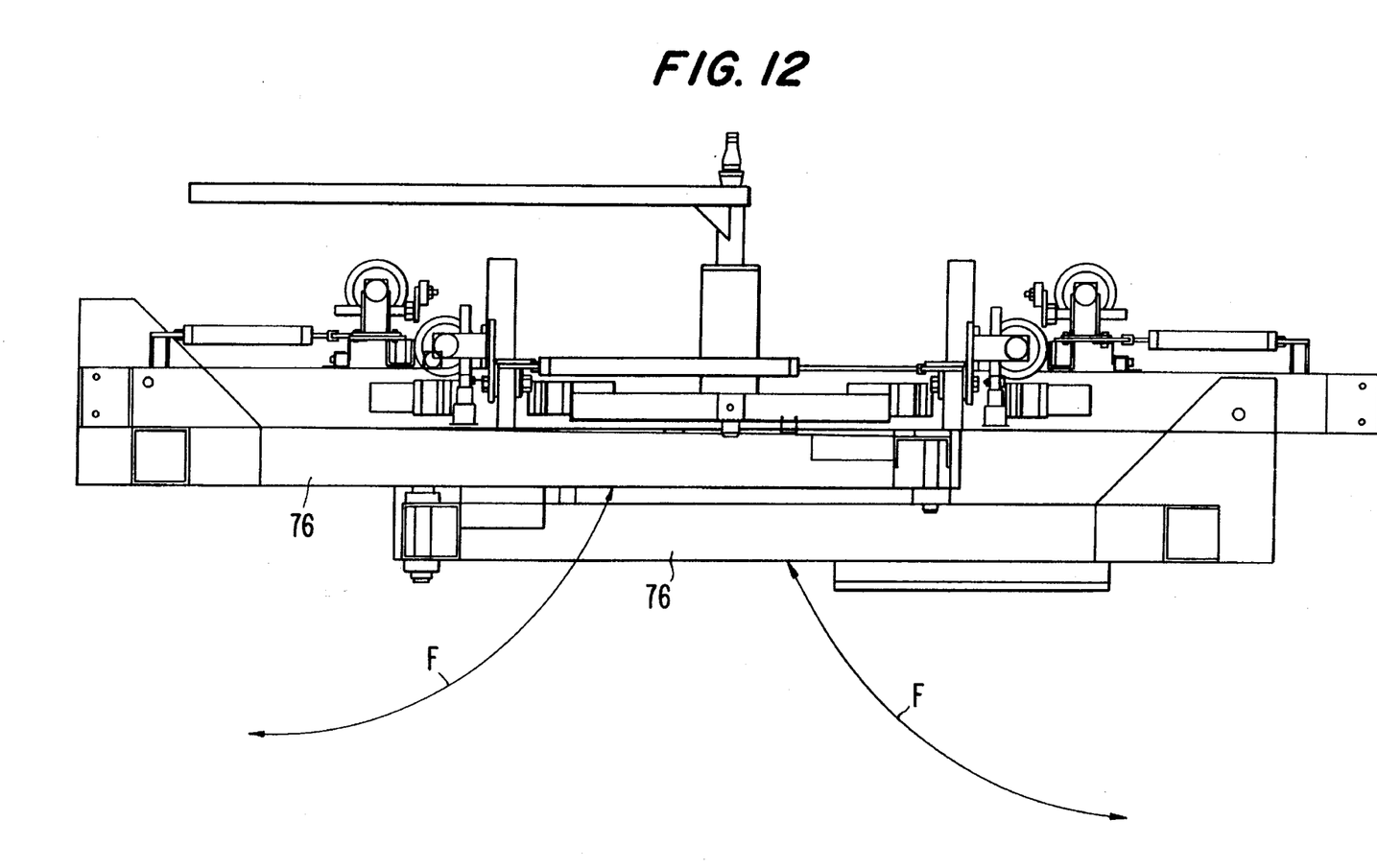
FIG. 12 is a front view showing the legs of the frame of the present invention in a folded or collapsed position.

The apparatus of the present invention also may be provided with foldable legs 76 as shown in FIGS. 11 and 12.

Each pair of legs 76 on each side of the apparatus is pivoted at pivot points 88 at the upper end thereof to the upper member of the frame 12. The legs may be pivoted in the directions of the arrows F shown in FIGS. 11 and 12 from a standing or operative position as shown in FIG. 11 to a folded stackable position as shown in FIG. 12. By being able to fold the legs inside of the frame of the apparatus, the entire apparatus may be far more conveniently packed for shipment and/or storage.

Moreover, the folding legs greatly facilitate erection of the apparatus at a work site. Since the apparatus is constructed of light weight material such as aluminum, workers can manually erect the apparatus to an operative position by first unfolding one pair of the legs on one side to raise one side of the apparatus and then unfolding the set of legs on the other side of the apparatus to raise the other side. This is a significant advantage to applicant's invention.

As best shown in FIGS. 4, 7 and 11, a control box 88 is provided on one set of the legs on the side of the apparatus and contains the various control mechanisms necessary to control operation of the washing device. In the case of the rollover type of apparatus the control box includes control mechanisms for reversing the direction of movement of the apparatus as well as for reversing the direction of rotation of each wrap around brush when the apparatus reverses direction. Moreover, in connection with the rollover type apparatus, a boom 90 is provided at the top thereof to facilitate control of the device.

As previously mentioned the device may also be operated as a stationary or tunnel type device. When the apparatus is constructed as a stationary type washing apparatus, it does not include the bottom wheel or roller structure, but simply is mounted on a stable surface without having any rollers at the bottom thereof.

Numerous modification and adaptions of the present invention will apparent to those skilled in the art and thus, it is intended by the following claims to cover all such modifications and adaptions and adaptations which fall within the true spirit and scope of the invention.

I claim:

1. A mechanized vehicle washing apparatus comprising:

a frame, a top scrubber curtain pivotally mounted to said frame;

means for reciprocating said top scrubber curtain to scrub a surface of a vehicle; and means for pivoting said top scrubber curtain in a horizontal plane into and out of a path of a vehicle to be washed.

2. A mechanized vehicle washing apparatus according to claim 1, which includes a top scrubber curtain pivotally mounted on each side of said frame, means for reciprocating each of said top scrubber curtains and means for pivoting each of said top scrubber curtains into and out of the path of a vehicle to be washed.

3. A mechanized vehicle washing apparatus according to claim 2, wherein each of said top scrubber curtains is mounted at its upper end to a rack, the material of each of said top scrubber curtains being notched at its inner upper end whereby the material extends beyond an inner upper end of its said rack and inner edges of said curtains are in adjoining relationship when the curtains are fully pivoted into the path of a vehicle to be washed.

4. A mechanized vehicle washing apparatus according to claim 2, which further includes a single common cylinder for controlling pivotal movement of both of said top scrubber curtains.

5. A mechanized vehicle washing apparatus according to claim 1, which includes means for reciprocating said top scrubber curtain forwardly and backwardly in directions parallel to the path of a vehicle to be washed.

6. A mechanized vehicle washing apparatus according to claim 5, wherein said means for reciprocating said top scrubber curtain includes a motor having a crank arm, a connecting rod comprised of an ultrahigh molecular weight plastic material connected at a first end to said crank arm and a rocker arm connected at a first end to a second end of said connecting rod and at a second end to said top scrubber curtain.

7. A mechanized vehicle washing apparatus according to claim 1, which includes means for reciprocating said top scrubber curtain side to side in directions angled to the path of a vehicle to be washed.

8. A mechanized vehicle washing apparatus according to claim 1, which further includes a wrap around brush pivotally mounted on each side of said frame along said path and a single common cylinder for controlling pivotal movement of both of said brushes.

9. A mechanized vehicle washing apparatus according to claim 8, which includes a motor for rotating each of said brushes and a flexible coupling for connecting each of said motors to one of said brushes.

10. A mechanized vehicle washing apparatus according to claim 1, wherein said frame is comprised of aluminum.

11. A mechanized vehicle washing apparatus according to claim 1, which is a rollover type washing apparatus further comprising:

wheels mounted on the bottom of said frame; and means for moving the apparatus forwardly and backwardly over a vehicle along a predetermined path.

12. A mechanized vehicle washing apparatus according to claim 11, wherein said wheels are comprised of an ultrahigh molecular weight plastic.

13. A mechanized vehicle washing apparatus according to claim 11, which further includes a rotatable wrap around brush mounted on each side of said frame and control means for reversing the direction of movement of said rollover type washing apparatus and for reversing the direction of rotation of each brush as the rollover apparatus reverses direction.

14. A mechanized vehicle washing apparatus according to claim 1, which includes a shaft mounted in a bearing, said bearing being comprised of an ultrahigh molecular weight plastic, for pivotally mounting said top scrubber curtain.

15. A mechanized vehicle washing apparatus according to claim 1, which includes high pressure spinner nozzles mounted on said frame.

16. A mechanized vehicle washing apparatus recording to claim 1 which further includes a wrap around brush pivotally mounted on each side of said frame along said path.

17. A mechanized vehicle washing apparatus comprising:

a frame, a top scrubber curtain pivotally mounted on each side of said frame;

means for pivoting each of said top scrubber curtains in a horizontal plane into and out of a path of a vehicle to be washed, said means comprising a single common cylinder for controlling pivotal movement of both of said top scrubber curtains.

18. A mechanized vehicle washing apparatus comprising:

a frame, said frame including upper frame members and legs on each side thereof, and means pivotally attaching said legs to each side whereby said legs are adapted to be folded inside of said frame;

a top scrubber curtain pivotally mounted to said frame; and means for pivoting said top scrubber curtain in a horizontal plane into and out of a path of a vehicle to be washed.

19. A mechanized vehicle washing apparatus comprising:

a frame, a top scrubber curtain pivotally mounted to said frame, said top scrubber curtain being comprised of a deep pile, fur-like material; and means for pivoting said top scrubber curtain in a horizontal plane into and out of a path of a vehicle to be washed.

20. A mechanized vehicle washing apparatus according to claim 19, wherein each said top scrubber curtain is comprised of a plurality of elongated strips.

21. A mechanized vehicle washing apparatus comprising:

a frame, a top scrubber curtain pivotally mounted to said frame;

means for pivoting said top scrubber curtain in a horizontal plane into and out of a path of a vehicle to be washed;

a wrap around brush pivotally mounted on each side of said frame along said path;

a single common cylinder for controlling pivotal movement of both of said brushes; and wherein said top scrubber curtain and said brushes are comprised of a deep pile, fur-like material.

22. A mechanized vehicle washing apparatus comprising:

a frame;

a rotatable wrap around brush pivotally mounted on each side of said frame along a path of a vehicle to be washed;

a first single common cylinder for controlling pivotal movement of both of said brushes;

a top scrubber curtain pivotally mounted on each side of said frame along said path; and means for pivoting each top scrubber curtain in a horizontal plane into and out of the path of a vehicle to be washed, said means for pivoting each said curtain comprising a second single common cylinder for controlling pivotal movement of both of said top scrubber curtains.

23. A mechanized vehicle washing apparatus according to claim 22, which includes high pressure spinner nozzles mounted on said frame.

\* \* \* \* \*